United States Patent
Oksman et al.

(10) Patent No.: US 8,422,687 B2
(45) Date of Patent: Apr. 16, 2013

(54) KEY MANAGEMENT FOR COMMUNICATION NETWORKS

(75) Inventors: Vladimir Oksman, Morganville, NJ (US); Neal King, Munich (DE); Charles Bry, Unterhaching (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1310 days.

(21) Appl. No.: 12/164,792

(22) Filed: Jun. 30, 2008

(65) Prior Publication Data
US 2009/0296924 A1 Dec. 3, 2009

Related U.S. Application Data

(60) Provisional application No. 61/057,679, filed on May 30, 2008.

(51) Int. Cl.
*H04L 29/06* (2006.01)
(52) U.S. Cl.
USPC .......................... 380/279; 380/259; 713/150
(58) Field of Classification Search .............. 380/255, 380/259, 262, 277–279, 283, 285, 44, 28, 380/30; 713/150, 153, 155, 168, 171
See application file for complete search history.

(56) References Cited

U.S. PATENT DOCUMENTS

2003/0188153 A1* 10/2003 Demoff et al. ............... 713/153
2004/0202328 A1* 10/2004 Hara ........................... 380/270

OTHER PUBLICATIONS

Menezes et al., "Handbook of Applied Cryptography", 1997, CRC Press, pp. 546-547.*
ITU-T, "Password-authenticated key exchange (PAK) protocol", 2007, International Telecommunications Union, entire document.*
International Telecommunication Union, ITU-T Telecommunication standardization Sector of ITU, X.1035 (Feb. 2007), Series X: Data Networks, Open System Communications and Security, Telecommunication Security, Password-Authenticated Key Exchange (PAK) protocol, 11 pgs.

* cited by examiner

*Primary Examiner* — Kambiz Zand
*Assistant Examiner* — John B King
(74) *Attorney, Agent, or Firm* — Eschweiler & Associates, LLC

(57) ABSTRACT

One embodiment of the present invention relates to a method for key management in a communications network. In this method, a public key authentication scheme is carried out between a security controller and a plurality of nodes to establish a plurality of node-to-security-controller (NSC) keys. The NSC keys are respectively associated with the plurality of nodes and are used for secure communication between the security controller and the respective nodes. Other methods and devices are also disclosed.

19 Claims, 7 Drawing Sheets ated key management 
KEY MANAGEMENT FOR COMMUNICATION NETWORKS

RELATED APPLICATION

This application claims priority to U.S. Provisional Application Ser. No. 61/057,679 filed May 30, 2008, entitled "Key Management for Communication Networks."

FIELD OF INVENTION

The present invention relates generally to communication networks and more particularly to security protocols for communication networks.

BACKGROUND

Home networks (HN) distribute broadband services within a customer's premises between various units of customer equipment. HNs can include wireline nodes that communicate over a wire-line medium (e.g., coax cable, optical fiber, twisted copper pair) and wireless nodes that wirelessly communicate with an Access Point or another wireless node. Often, the access node is a central node of the HN and generally connected to other network nodes by fixed (usually wire-line) connections.

One of the main issues for HN solutions, whether wire-line or wireless, is security. Because HNs operate over shared media, in the absence of adequate security measures, any HN user's digital communications may become an easy target for an intruder. As digital content becomes more pervasive in our lives, there is a need for improved security measures to ensure this content is adequately protected.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a method for key management in a communications network. In this method, a public key authentication scheme is carried out between a security controller and a plurality of nodes to establish a plurality of node-to-security-controller (NSC) keys. The NSC keys are respectively associated with the plurality of nodes and are used for secure communication between the security controller and the respective nodes. Other methods and devices are also disclosed.

The following description and annexed drawings set forth in detail certain illustrative aspects and implementations of the invention. These are indicative of but a few of the various ways in which the principles of the invention may be employed.

FIGURES

Figure 6:
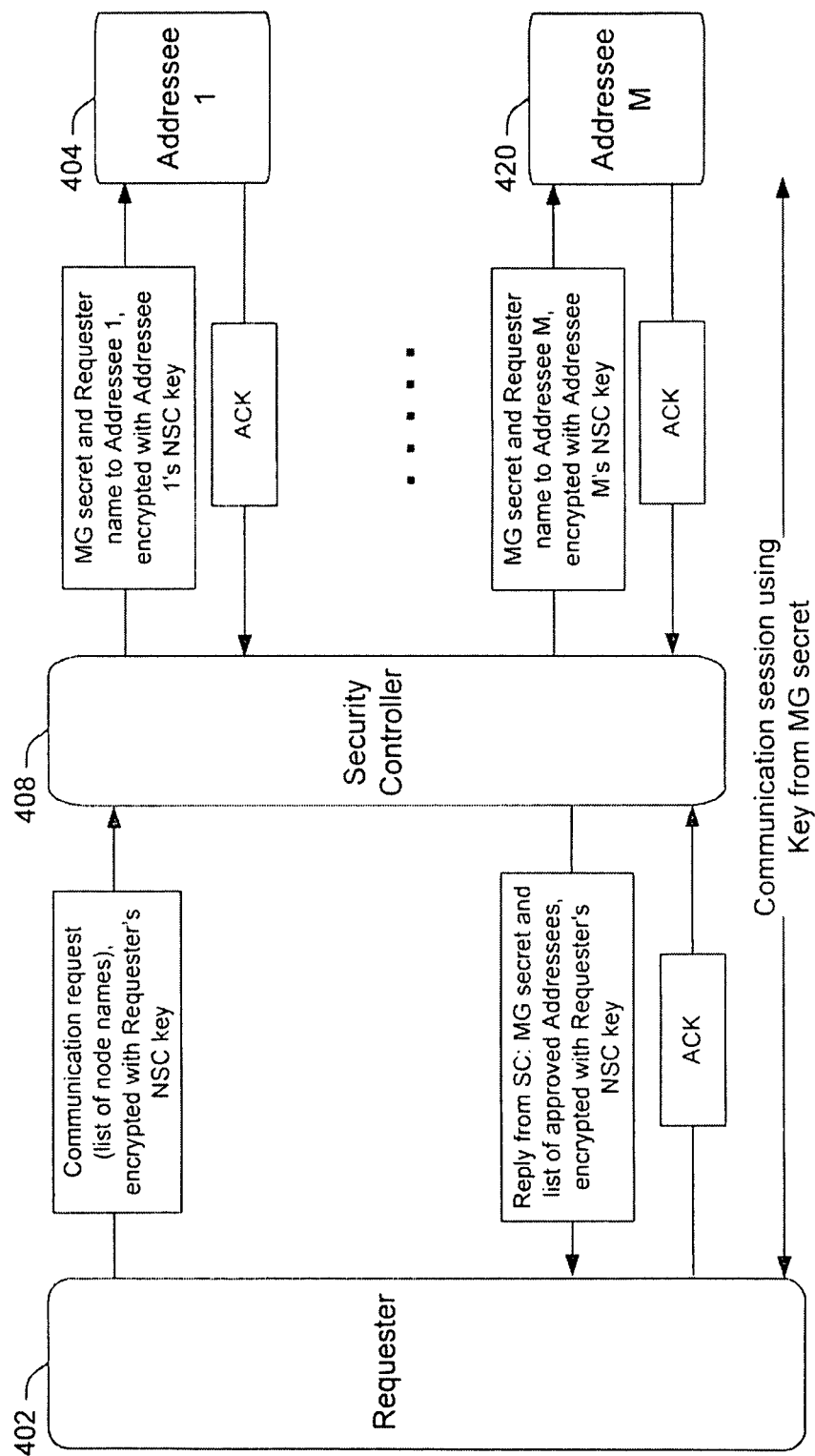
Figure 7:
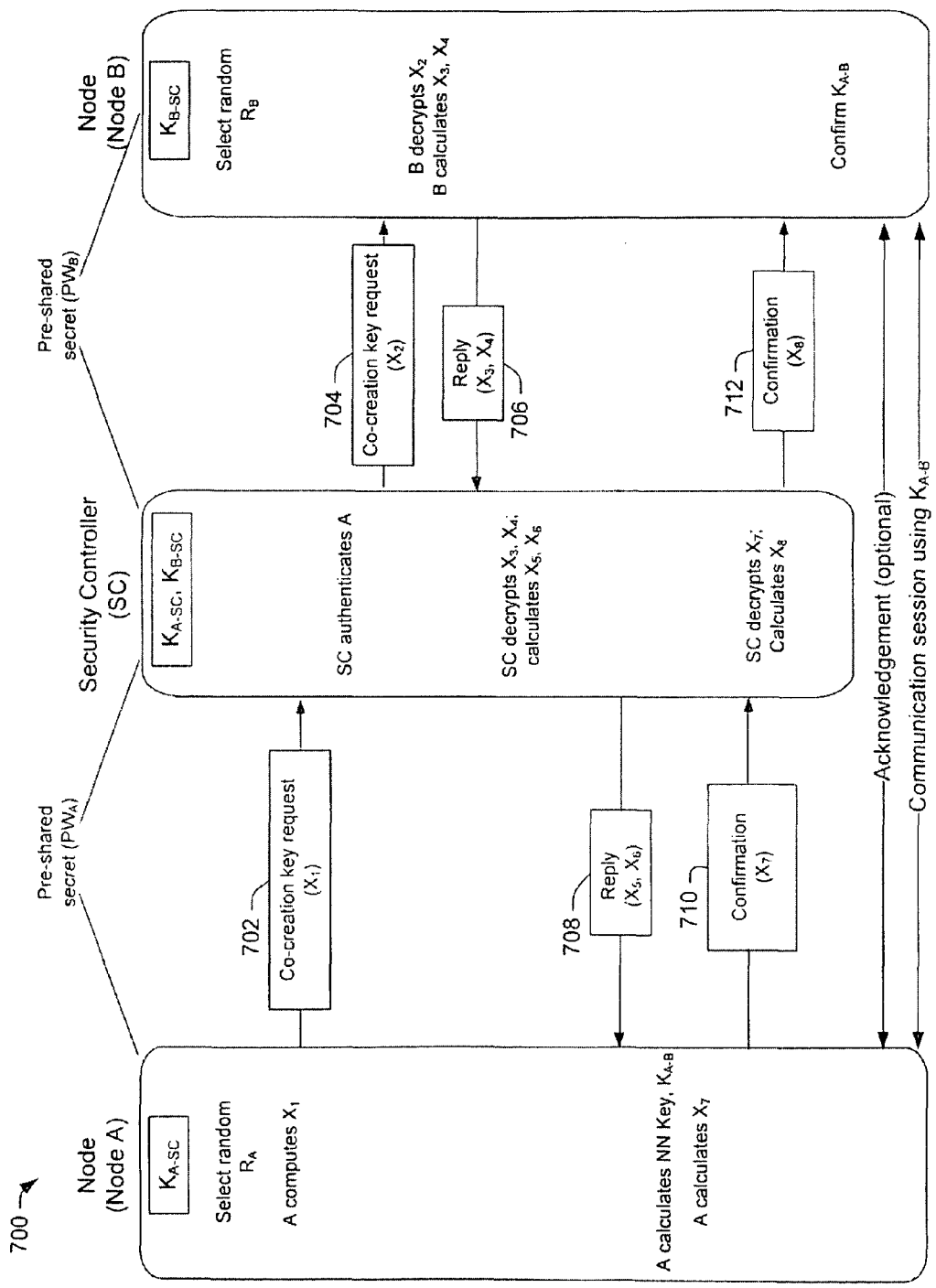

FIG. 6 illustrates one embodiment of a multi-cast method for distribution of session keys from one node to several other nodes, where the one node uses a common session key for communication with the several other nodes; and FIG. 7 shows another embodiment of a public key authentication scheme, wherein two network nodes negotiate a session secret through a security controller but where the security controller cannot decypher the session secret.

DETAILED DESCRIPTION OF THE INVENTION

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

Some aspects of the invention propose an authenticated key management (AKM) procedure in which a security controller negotiates various keys with several network nodes. The security controller establishes a unique node-to-security-controller (NSC) encryption key for each network node, often by a public key authentication procedure carried out separately for each node. When a node (requester) desires to exchange information with another node (addressee), the requester sends a request to the security controller. The security controller then calculates session keys for the pair of nodes, and sends the session keys to the nodes using the NSC keys respectively associated with the nodes. Aspects of the invention are applicable to HNs having point-to-point architecture, i.e., in which each node can communicate directly with any other node, without the intermediation of the Access Point. In addition, the procedure includes a startup mechanism, allowing a new node to quickly join the network, and start communicating with another node. It also improves "usability" of authentication using a pre-shared secret, such as a password known only to a network node and the security controller.

Figure 1:
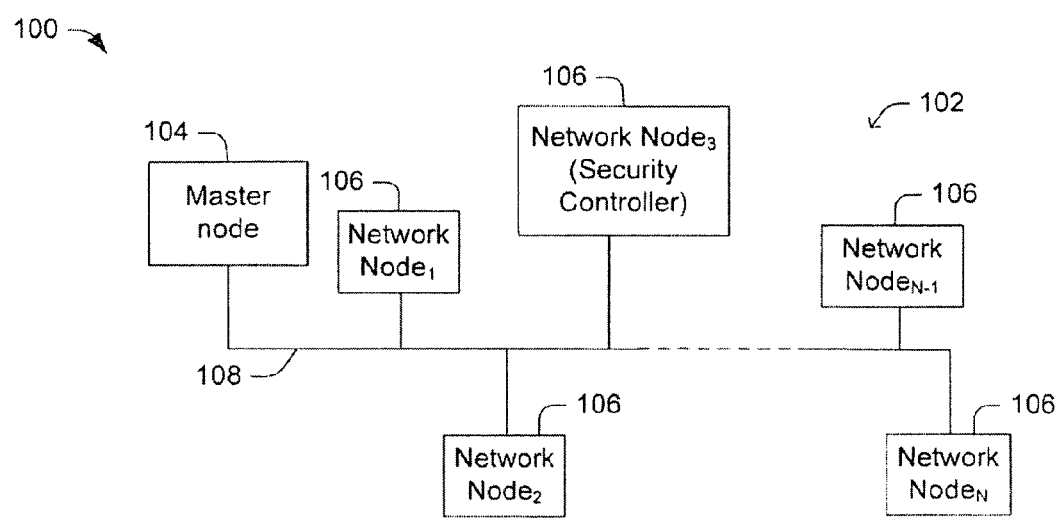
FIG. 1 illustrates one embodiment of a network that transmits data over a transmission medium between nodes of the network.

As shown in FIG. 1, one embodiment of the invention considers a HN 100 including a number of nodes 102 that communicate over a medium 108. A master node 104 usually controls distribution of bandwidth resources to the other network nodes 106. This allows the master node 104 to support quality of service (QoS) requirements for the other network nodes 106 and perform all auxiliary management functions (performance monitoring, provisioning, statistics, etc.). One of the nodes 102 (either the master node 104 or one of the other network nodes 106) operates as Security Controller, the function of which is to manage security procedures in the network. In the illustrated embodiment, for example, Network Node 3 acts as a Security Controller.

The network 100 operates using all types of communication between nodes 102. For example, communication could be node-to-node (unicast), node-to-multinode (multicast), node-to-all (broadcast), and/or relay (a node serves as the only communication path between two other nodes).

Several illustrative key management protocols are discussed in this application. The various components of the network 100 and other systems of the invention include suitable circuitry, state machines, firmware, software, logic, etc. to perform the various methods and functions illustrated and described herein, including but not limited to the methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated acts or events may be required to implement a methodology in accordance with the present invention.

In these protocols, it is assumed that prior to operation, each node is assigned a unique node name, a node Password (which could be also the same for all nodes in the network; in this case it would serve as the Network Password), and the Node Name of the node that will act as the security controller. It is also assumed that the Master Node knows the node names of all the other nodes, and that the security controller knows a pre-shared secret (e.g., password) for all of the other nodes.

Figure 2:
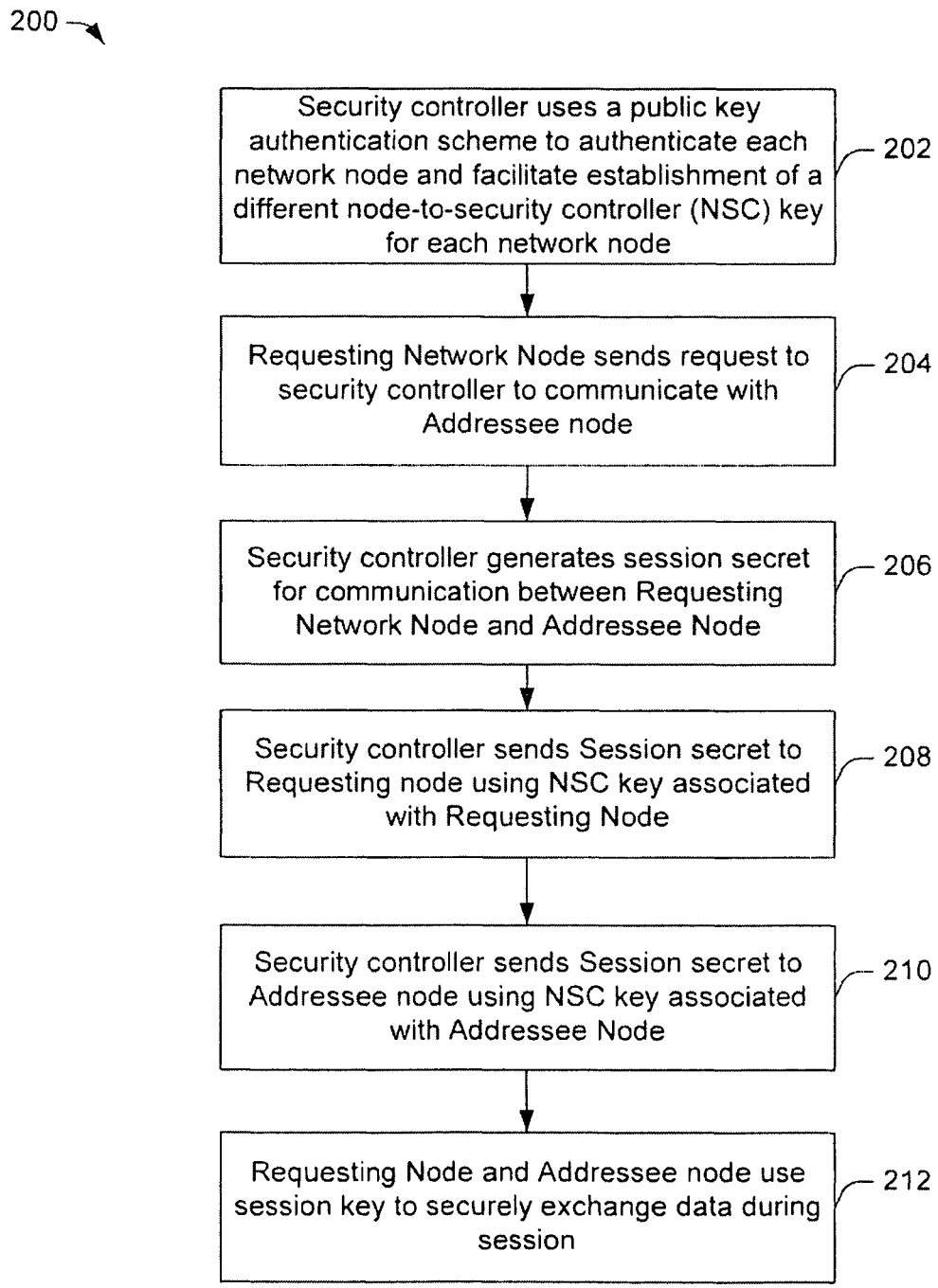
FIG. 2 shows a flow chart in accordance with one embodiment of a key management scheme for a network.

FIG. 2 shows a flowchart 200 of one embodiment of key management in such a network. At 202 the security controller uses a public-key authentication scheme to individually authenticate each network node and establish a different node-to-security controller (NSC) key for each network node.

At 204, a requesting network node sends a request to the security controller to communicate with an addressee node.

At 206, in response to the communication request, the security controller generates a session secret for communication between the requesting network node and the addressee node.

At 208, the security controller sends the session secret to the requesting node using the NSC key associated with the requesting node. At 210, the security controller sends the session secret to the addressee node using the NSC key associated with the addressee node. In this manner, the requesting node and the addressee node securely receive the session secret. Because each node has its own NSC key, the security controller ensures both nodes securely receive the session secret.

At 212, the requesting node and addressee node use the session secret to generate a session key. The session key could be the session secret itself, or could be derived from the session secret in a predictable way. For example, the session key could be calculated by using a series of hash calculations that incorporate the session secret, and possibly incorporate other known information (e.g., network node name, session ID, etc.) The session key is then used to securely exchange data between the requesting node and addressee node, often using a symmetric cipher, during a communication session.

In one embodiment outlined below, an authenticated key management procedure includes several steps: permission for non-secure access, public key authentication and NSC key setup, session key generation, key updates, and backup.

1. Permission for Non-Secure Access

A node seeking network access sends a request to the Master for non-secure access. The node sends its Node Name and its main characteristics and capabilities. The Master analyzes the request, makes a decision whether to admit the node to the network, and replies to the node. The reply contains confirmation of admission and the Network Name of the node. Since the Node Name of the node is shared with the Master prior to node installation, the Master can filter out nodes that belong to neighboring HN. All communications during this exchange are assumed to be non-secure (not encrypted).

A node which obtains non-secure access can communicate in non-secure mode and can request secure access from the SC (Public Key Authentication and Key Setup).

2. Public Key Authentication and NSC Key Setup

Figure 3:
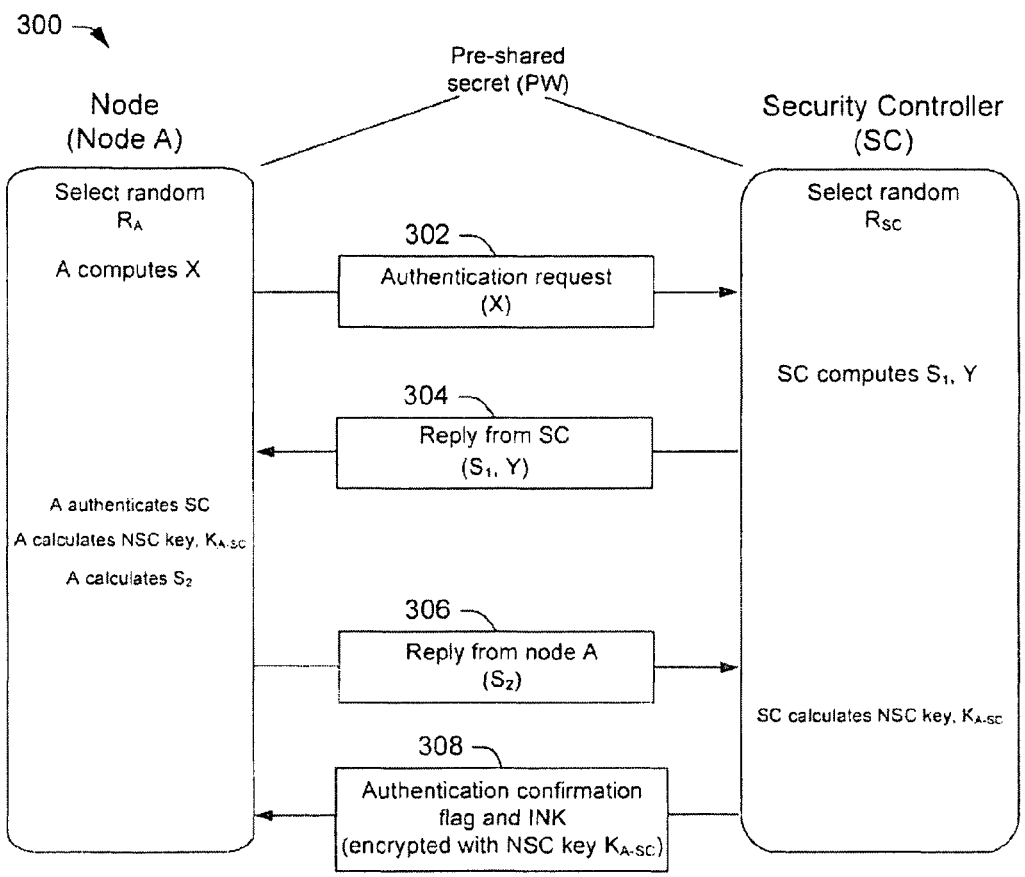
FIG. 3 shows one embodiment of a public key authentication scheme that uses a Diffie-Hellman algorithm.

For secure access, the node initiates an authentication handshake using a public key authentication scheme. FIG. 3 shows one embodiment of a public key authentication scheme 300 using a Diffie-Hellman protocol, consistent with X.1035. In this figure and accompanying discussion the following conventions are used: $H_i(u)$ denotes an agreed-upon hash function computed over a string u, where i=1, 2, 3 . . . ; and s|t denotes concatenation of the strings s and t. p and g are (publicly accessible) constants, where p is a prime number that is large enough to make computation of discrete logarithm infeasible; and powers of g modulo p cover the entire range of (p minus 1) integers from 1 to (p minus 1).

The node seeking secure access (node A) and the SC use a pre-shared secret (e.g., password PW) which is not communicated through the network in unencrypted format. Thus, the SC can store a list that includes a separate password for each node associated with the network. This pre-shared secret serves to individually authenticate each node.

Initially, network node A selects a secret, random exponent $R_A$ and computes $g^{R_A}$ mod p. SC selects a secret, random exponent $R_{SC}$ and computes $g^{R_{SC}}$ mod p.

At 302, Network Node A initiates the exchange by sending the quantity $X=H_1(A|SC|PW)\cdot(g^{R_A}$ mod p) to SC, where A is the Node Name of Node A and SC is the Node Name of the SC.

SC, upon receiving X, verifies that X is not a zero and then divides it by $H_1(A|SC|PW)$ to recover ($g^{R_A}$ mod p). Then, based on the random number $R_{SC}$, SC computes $$S_1 = H_3\left(A|SC|PW\left|\frac{X}{H_1(A|SC|PW)}\right|\right.$$
$$\left.g^{R_{SC}} \bmod p \left|\left(\frac{X}{H_1(A|SC|PW)}\right)^{R_{SC}} \bmod p\right)\right)$$

and $Y=H_2(A|SC|PW)\cdot(g^{R_{SC}}$ mod p). At 304, SC sends to network node A a message that contains both quantities $S_1$ and Y.

Upon receiving message 304 and verifying that Y is non-zero, A authenticates SC by recovering what should be ($g^{R_{SC}}$ mod p) in computing $S_1'$ itself:

$$S_1' = H_3\left(A|SC|PW|g^{R_A} \bmod p\right.$$
$$\left.\left|\frac{Y}{H_2(A|SC|PW)}\right|\left(\left(\frac{Y}{H_2(A|SC|PW)}\right)^{R_A} \bmod p\right)\right)$$

If indeed $$(g^{R_{SC}} \bmod p) = \frac{Y}{H_2(A|SC|PW)},$$

then the result $S_1'$ is equal to the received value $S_1$, Node A computes the NSC key:

$$K_{A-SC} = H_3\left(A|SC|PW|g^{R_A} \bmod p\right.$$
$$\left.\left|\frac{Y}{H_2(A|SC|PW)}\right|\left(\left(\frac{Y}{H_2(A|SC|PW)}\right)^{R_A} \bmod p\right)\right)$$

To allow SC to authenticate Node A and complete the exchange, node A also computes the quantity $$S_2 = H_4\left(A|SC|PW|g^{R_A} \bmod p \right.$$
$$\left. \left|\frac{Y}{H_2(A|SC|PW)}\right| \left\{\left(\frac{Y}{H_2(A|SC|PW)}\right)^{R_A} \bmod p\right\}\right)$$

and sends it to SC in message 306.

SC authenticates Node A by computing $S_2'$ itself:

$$S_2' = H_4\left(A|SC|PW|\frac{X}{H_1(A|SC|PW)}\right.$$
$$\left. |g^{R_{SC}} \bmod p| \left\{\left(\frac{Y}{H_1(A|SC|PW)}\right)^{R_{SC}} \bmod p\right\}\right)$$

and checking it against the value of $S_2$ received from Node A. If both values are the same, SC proceeds to compute the NSC key:

$$K_{A-SC} = H_5\left(A|SC|PW|\frac{X}{H_1(A|SC|PW)}\right.$$
$$\left. |g^{R_{SC}} \bmod p| \left\{\left(\frac{X}{H_1(A|SC|PW)}\right)^{R_{SC}} \bmod p\right\}\right)$$

If any of the above verifications fails, the protocol halts, otherwise both nodes have authenticated each other and have established the NSC key.

After the NSC key is generated between Node A and SC, the SC sends to node A confirmation of its permission for secure access and, possibly, an in-network secret (INS), which is used to derive a set of in-network keys (INK) intended to communicate with other network nodes that have information that can be shared within the HN, but should not be shared with outsiders. The confirmation and the INS are encrypted by NSC key.

The use of the Diffie-Hellman protocol is not the only mechanism taught for public key authentication. Other public key authentication schemes may be used, which employ a shared secret to allow authentication between nodes without assuming secure communications. For example, RSA, elliptic curve, or El Gamal encryption, among others could also be used. In another embodiment, a pre-shared secret method can be used if a unique key is set for each node prior to installation (instead of a Password) and typed into the SC. A weakness of the pre-shared key method is that it is often impractical to update it (manually) and a special updating mechanism, including special "key updating" keys or secret is needed. It is also less convenient in support of SC backup.

Another use of the pre-shared key is to limit its use for only negotiating keys to be used for data encryption, and for updating such keys.

3. Generation of Node-to-Node Session Keys

Figure 4:
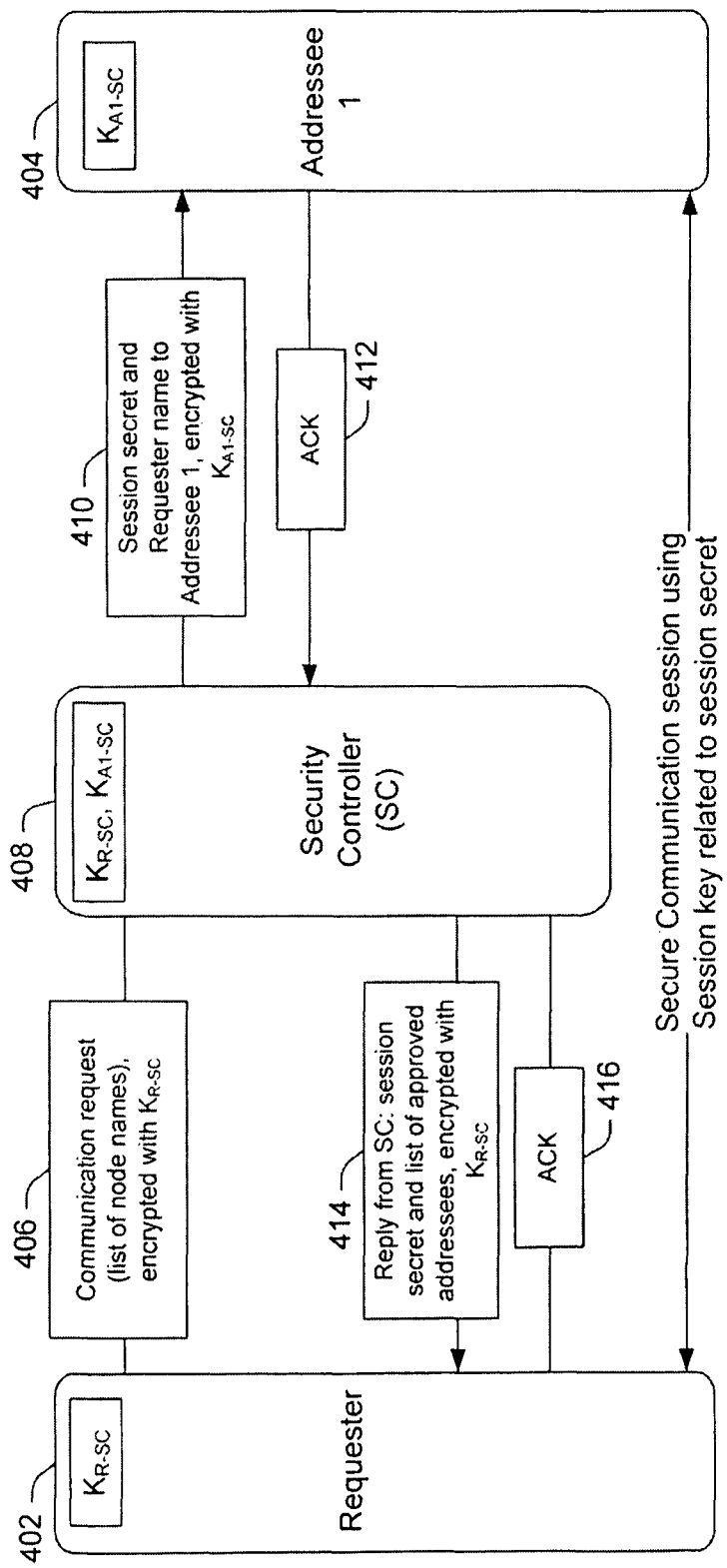
FIG. 4 illustrates one embodiment of a node-to-node method for distribution of session keys between a pair of nodes.

FIG. 4 shows one manner in which a pair of nodes (requester 402, addresee 404) who are admitted to the network may carry out secure communication. In this example, it is assumed that the SC has already negotiated NSC keys with each node, for example as previously discussed. Thus, Requester and SC share NSC key $K_{R-SC}$, and Addressee 1 and SC share NSC key $K_{A1-SC}$.

If the requester 402 needs to communicate with the addressee 404, the requester 402 sends a request 406 to the SC 408 including the name of the addressee. The requester 402 encrypts this request 406 based on $K_{R-SC}$. This ensures that Requester 402 has been authenticated and that the content of message 406 is securely exchanged. Often, this encryption is performed with a symmetric cipher (e.g., AES, DES, 3DES, RC-4), that uses $K_{R-SC}$ or a key derived from $K_{R-SC}$.

The SC 408 checks whether the Requester is allowed to talk to the Addressee 404 (e.g., by checking the SC's list of forbidden connections; or alternatively, the SC's list of approved connections). If so, the SC 408 generates a session secret to be used in the requested communication between the Requester and the Addressee.

At 410, the SC 408 encrypts this session secret with $K_{A1-SC}$ (or key derived therefrom), and encryptedly transmits the session secret to the Addressee. Often, this encryption is performed with a symmetric cipher. The Addressee 404 can acknowledge 412 receipt of the session secret.

At 414, the SC 408 encryptedly transmits this session secret with $K_{R-SC}$ (or key derived therefrom). The Requester can acknowledge 416 receipt of the session key to the SC. Acknowledgements may be structured to include a value which confirms that the session secret was received correctly (e.g., send back an expected value encrypted by the received session secret or by a session key derived from the session secret). The acknowledgement may also be encrypted by the corresponding NSC key.

As both the Requester and the Addressee now possess the session secret, they can then communicate payload data between themselves using the session secret or a session key derived from the session secret. For example, both Requester and Addressee could use the session secret to generate one or more session keys in a pre-defined way, and use them in coordinated order.

In FIG. 4, it is assumed that the SC generates the session secret and distributes it to both the Requester and the Adressee 1. Alternatively, the session secret could be generated by one of the Requester or the Addressee 1, and then distributed to the other by the SC. For example, the Requester could use its NSC key to encryptedly transmit a request to the SC, where the request includes a session secret. The SC then checks to see whether the Addressee is authenticated. Assuming the Addressee is authenticated, the SC encryptedly transmits the session secret to Addressee 1 using Addressee 1's NSC key. Addressee 1 can acknowledge the receipt of the session secret to the SC (using NSC key) or to the Requester (using a session key related to the session secret).

Figure 5:
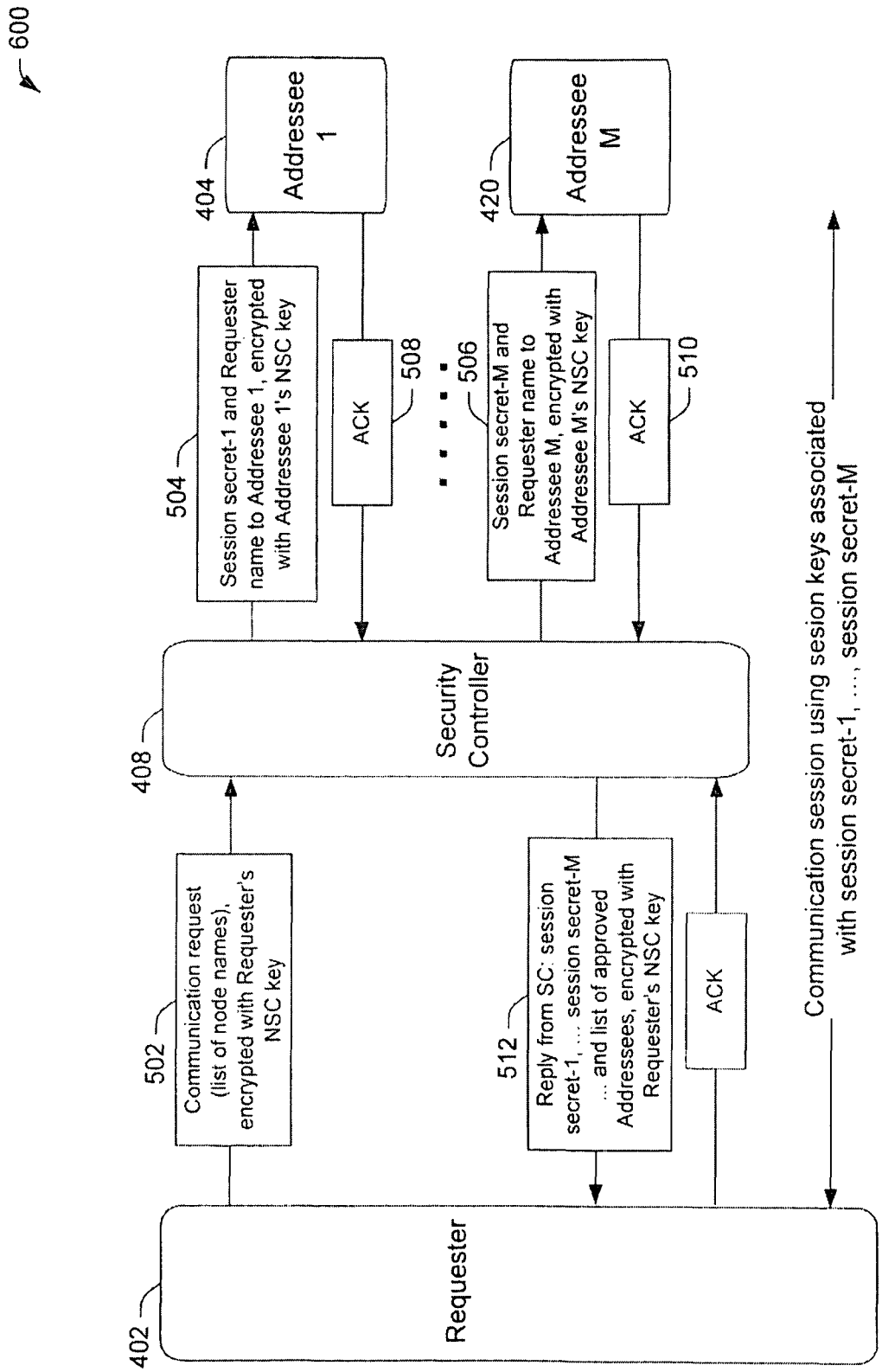
FIG. 5 illustrates one embodiment of a multi-cast method for distribution of session keys from one node to several other nodes, where the one node uses a different session key for communication with each of the several other nodes.

Although FIG. 4 describes the distribution of the session secret for one Requester and one Addressee, the protocol can be generalized for the case when one Requester intends to generate session secrets for communication with several Addressees. Such a scenario is shown in FIG. 5. In FIG. 5's protocol, after receiving a request from the Requester 402 with the list of Addressees, the SC 408 generates M session secrets (session secret-1, session secret-2, ... session secret-M), where each session secret is to be associated with an individual Addressee with which the Requester is entitled to communicate. Each of these Addressees (e.g. 404, 420) is sent its respective session secret individually encrypted with the respective NSC (e.g., 504, 506). The SC can be informed of successful acknowledgements (e.g., 508, 510). If the Requester is informed about all session secrets in a single summary message 512, this procedure significantly reduces the number of times the NSC is used, which saves bandwidth and reduces the security risk, due to the smaller number of messages.

FIG. 6 shows a case of multicast transmission 600, where the SC 408 generates a single session secret intended for all nodes of the communication session (Requester 402 and several Addressees (e.g., 404, 420)). This session secret can be called a Multicast Group (MG) secret. The MG secret is first sent to all Addressees (encrypted by the individual NSC), and then to the Requester, similarly as it is done in case of unicast (see FIG. 4) and multi-node unicast (see FIG. 5). Again, the Addressees and Requester could use the MG secret directly as a session key, or could derive the session key in a predictable manner from the MG secret. In this embodiment, communications between the nodes will be secure from outside intruders, but will be accessible to the network nodes sharing the MG secret.

4. Updates of NSC Keys and Session Keys

NSC keys should be updated from time to time to maintain security: The more time has passed, and the more messages have been transmitted using a specific NSC key, the more likely it is that the key can be broken. The update procedure may be seamless, i.e., it does not disturb the existing communication sessions.

One way of updating the NSC key is to re-authenticate the node using the public key authentication scheme as described in FIG. 2. The node can update the NSC during the communication session, without disturbing it.

Another way of updating the NSC key is to generate a special NSC updating (NSCU) key, which is exclusively intended to update the NSC key. This NCSU key can be co-generated by the node and the SC, as was the NSC key, or it can be generated by the SC and communicated to the node encrypted by NSC key, as was the session secret (as soon as possible, e.g., in the reply from SC to Requester, FIG. 3). When SC decides to update the NSC, it will generate a new NSC key just as it generates a session secret or MG key. The SC will then communicate the new NSC key to the node encrypted by its NSCU. This method may also be used when authentication is based on a pre-shared secret.

Session keys can also be updated during the communication session without interrupting it. The update can be initiated by either communicating node, but usually is initiated by the Requester. In one implementation, the Requester repeats the general procedure of generating session keys. When both the Requester and the Addressee have received a new set of session keys from the SC, the Requester sends to the Addressee a request to change to use of the new session key. The SC acknowledges the request indicating the instant of time from which the new session key should be used by both Requester and Addressee.

Alternatively, a set of session keys generated by the SC may include a special session update key (SUK), which is intended exclusively for session key updates, as was the NSCU.

Another, simpler possibility, is that the Requester generates itself an updated session key and sends it to the Addressee encrypted by the old session key. This, however, may not be reliable if the initial session key was broken by the intruder before the update.

5. Back-Up SC

Since SC is maintaining all the security procedures in the network, it should be possible to backup SC in case of failure. The backup procedure can be seamless, i.e., not disturb the existing services when it replaces the failed SC.

A. Establishing a Backup SC

When installed, SC selects one or more back-up SCs among the nodes that are authenticated to the network and capable of performing the SC functions. The selection process is done securely: the SC may establish a special encryption key for selection of the back-up SC, similarly to establishing a session key. In this way, potential intruders will not know which node is the backup SC. If more than one backup SC is selected, the SC selects also the order of the backup (i.e., the primary backup SC, the secondary backup SC, etc.)

The SC transmits all necessary security information to the selected back-up SCs in a secure way. This security information can include, but is not limited to: a list of Node Names and Node Passwords of all nodes in the network. To ensure communications remain secure, the SC often does not send the NSC keys to the backup SCs at this time. The SC also securely communicates the Node Name of the backup SC to all nodes.

Alternatively, the selected back-up SC may have already created NSC keys for each of the nodes, prior to the failure of the original SC. The methods by which these NSC keys can be created can be completely analogous to the methods by which the node-to-node keys are created. Indeed, the only difference may be that node-to-node keys for a back-up SC are used for normal data transmission protection between the nodes and the back-up SC; whereas the NSC keys are used to provide SC-specific services such as authentication and trusted-broker node-to-node key negotiation to the nodes. In one implementation, one might not bother to make this distinction at all: the node-to-node key between the back-up SC and another node could be put into service as the NSC key between the same pair. This could have the disadvantage that the NSC key would be involved in encrypting more messages; however, this risk could be overcome by replacing the NSC/node-to-node keys more frequently.

B. Detection of SC Failure

From time to time (e.g., periodically), the SC should re-authenticate each node to update the NSC key. If any node, including a backup SC, concludes that SC fails to do this within a reasonable time period, the node broadcasts a warning. The same warning may be sent by a Requester after several attempts to establish communication with an Addressee. The warning may be encoded using the broadcast key, so non-authorized listeners don't know that the SC may be down. If the SC fails to respond, the node issues a second warning. Then the designated back-up SC (which knows all the Node Names & Passwords, but not the NSC keys) takes over.

C. Backup Mechanism

To properly act as a SC, the new SC establishes NSC keys for all the nodes.

In one embodiment, the new SC completely re-negotiates NSC keys using a public key authentication procedure, such as previously described with reference to FIG. 3. Although this embodiment is computationally expensive, it provides a good deal of security because each node potentially has a different NSC key that is only known to itself and the new SC. This embodiment may have a drawback in that it may require extra effort to securely distribute the pre-shared secrets to the new SC.

In another embodiment, the old SC may transmit the NSC keys to the new SC prior to failure. To accomplish this, the old SC may intermittently use a symmetric cipher to encryptedly transmit the NSC keys to the new SC, for example. Thus, when the new SC comes online, it could step right into the shoes of the old SC. One disadvantage of this embodiment is that both the old SC and the new SC may simultaneously have access to session keys, thereby reducing security in some respects.

In still another embodiment, the old SC could transmit a backup NSC key, for example via a symmetric cipher, to each node. Each backup NSC key would also be transmitted to the new SC prior to the old SC's failure. Whenever the new SC comes online, the new SC and each node could then begin using the backup NSC key. In this manner, each node could hold multiple sets of keys (e.g., an NSC key, and a backup NSC key), but use only a single NSC key at a given time. This helps to ensure that only a single SC will be able to decipher communications from the node, thereby promoting secure communications.

6. Another Key Management Process

Referring now to FIG. 7, another embodiment of a key management process is depicted. In this figure, the Security controller is used to provide authentication for two nodes that co-create a session secret (or symmetric key) with information wholly provided from within the nodes. This key management process has an advantage from earlier key management methods in that the session secret is kept secret from the security controller. Therefore, only the two nodes that are involved in the communication session know the session secret.

At the start of this process, nodes A and B have already established NSC keys ($NSC_{A-SC}$, $NSC_{B-SC}$, respectively) with the security controller, for example as already discussed with FIG. 3. The nodes also initally calculate random numbers $R_A$, $R_B$, respectively, which will be used in the key generation process.

Initially, network node A selects a secret exponent $R_A$ and computes $g^{R_A}$ mod p. Network node A then encrypts this value with $K_{A-SC}$ to obtain $X_1$. Often, this encryption is symmetric key encryption.

At 702, network node A sends $X_1$ to the security controller. SC uses $K_{A-SC}$ to decrypt $X_1$, thereby authenticating that $X_1$ originated at Network Node A. SC then verifies that Node A is allowed to talk with Node B.

If Node A is allowed to talk with Node B, SC uses $K_{B-SC}$ to symmetrically encrypt $g^{R_A}$ mod p and generate $X_2$. SC then transmits a co-creation key request 704, which includes $X_2$, to Node B.

Next, Network Node B decrypts $X_2$ using $K_{B-SC}$. To provide for authentication and key generation, Network Node B calculates $M_1$ and Z, as follows:

$$M_1'=H_3(g^{R_A} \bmod p | g^{R_B} \bmod p | (g^{R_A})^{R_B} \bmod p);$$

$$Z=g^{R_B} \bmod p;$$

Node B then generates $X_3$ by encrypting $M_1$ with $K_{B-SC}$, and generates $X_4$ by encrypting Z using $K_{B-SC}$. At 706, Network Node B sends a reply, which includes $X_3$ and $X_4$.

SC receives the reply 706 and uses $K_{B-SC}$ to decrypt $X_3$, $X_4$, thereby obtaining $M_1$, Z. SC then uses $K_{A-SC}$ to encypt $M_1$ and Z to obtain $X_5$ and $X_6$, respectively.

At 708, SC replies to A, transmitting $X_5$ and $X_6$.

Node A, upon receiving that quantity, uses $K_{A-SC}$ to decrypt $X_5$ and $X_6$. A then calculates $M_1'=H_3(g^{R_A} \bmod p | Z | Z^{R_A} \bmod p)$;

If the calculated $M_1'$ matches the received value $M_1$, the transaction is valid. A then calculates a node-to-node (NN) Key, $K_{A-B}$, as follows:

$$K_{A-B}=H_5(g^{R_A} \bmod p | Z | Z^{R_A} \bmod p)$$

For purposes of authentication and integrity, Node A also calculates $M_2$ $M_2=H_4(g^{R_A} \bmod p | Z | Z^{R_A} \bmod p)$, and uses $K_{A-SC}$ to encrypt $M_2$ to generate $X_7$.

At 710, Node A sends a confirmation that includes $X_7$. SC decrypts $X_7$, using $K_{A-SC}$, and encrypts $M_2$ using $K_{B-SC}$, as $X_8$. A confirmation 712, including $X_8$, is sent to Node B.

Finally Node B computes $M_2'$ as:

$M_2'=H_4(g^{R_A} \bmod p | g^{R_B} \bmod p | (g^{R_A})^{R_B} \bmod p)$ and compares it to the received value, $M_2$. If they match, the Node-to-Node Key $K_{A-B}$ is confirmed, and used in the subsequent communication session as shown. One version of the subsequent communication session could include an Acknowledgement of the receipt of the key, sent from B to A directly. On the one hand, this acknowledgement may make it easier to diagnose any interoperability troubles between the nodes. On the other hand, from the point of view of security, it is bad practice to encrypt a message that has a meaning that the attacker will be able to guess. Nonetheless, all such embodiments fall within the scope of the present application.

While examples of the invention have been illustrated and described with respect to one or more implementations, alterations and/or modifications may be made to these examples without departing from the spirit and scope of the appended claims. In regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for key management in a premises network, comprising:
   at a security controller having hardware, receiving a plurality of authentication requests from a plurality of premises nodes, respectively;
   in response to the plurality of authentication requests, carrying out a public key authentication scheme between the security controller and the plurality of premises nodes, respectively, to establish a plurality of node-to-security-controller (NSC) keys, respectively;
   transmitting secure messages from the security controller to the premises nodes or receiving secure messages from the premises nodes at the security controller using the NSC keys respectively associated with the plurality of premises nodes.

2. The method of claim 1, further comprising:
   receiving at the security controller a communication request from a first of the plurality of premises nodes, where the communication request specifies at least a second premises node with which the first premises node desires to communicate;
   encryptedly transmitting from the premises security controller a session secret to the first and second premises nodes, respectively, using the NSC keys associated with the first and second premises nodes, respectively.

3. The method of claim 1, further comprising:
   receiving at the security controller a communication request from a first of the plurality of premises nodes, where the communication request specifies a session secret and at least a second premises node with which the first premises node desires to communicate;

encryptedly transmitting from the security controller the session secret to the second premises node using an NSC key associated with the second premises node.

4. The method of claim 1, further comprising:

receiving at the security controller a communication request from a first of the plurality of premises nodes, where the communication request specifies at least a second premises node with which the first premises node desires to communicate;

encryptedly transmitting the communication request from the security controller to the second premises node using an NSC key associated with the second premises node; and receiving a response from the second premises node at the security controller, where the response includes a session secret and is encrypted with the NSC key associated with the second premises node.

5. The method of claim 1, further comprising:

receiving a first message from a first of the plurality of premises nodes, and decrypting the first message with a first NSC key associated with the first premises node to obtain a first modular exponentiation result.

6. The method of claim 5, further comprising:

encrypting the first modular exponentiation result with a second NSC key associated with a second of the plurality of premises nodes;

transmitting the encrypted first modular exponential result to the second premises node.

7. The method of claim 6, further comprising:

receiving a second message from the second premises node, and decrypting the second message with the second NSC key to obtain a second modular exponentiation result that may be different from the first exponentiation result.

8. The method of claim 7, further comprising:

encrypting the second modular exponentiation result with the first NSC key; and transmitting the encrypted second modular exponential result to the first premises node.

9. The method of claim 8:

where the first modular exponentiation result relates to a first random number, $R_A$, at the first premises node; and where the second modular exponentiation result relates to a second random number, $R_B$, at the second premises node.

10. The method of claim 9, where the first and second premises nodes use the random number at that respective premises node along with the modular exponentiation result calculated by the other premises node to cooperatively determine a shared secret that is confidential from the security controller.

11. The method of claim 10, further comprising:

carrying out symmetrically encrypted communication between the first and second premises nodes during a communication session using a symmetric key related to the session secret.

12. The method of claim 1, further comprising:

selecting a backup security controller to be used when the security controller is unavailable or untrustworthy.

13. The method of claim 12, wherein the back up security controller is selected from among premises nodes that have been authenticated with the premises network prior to the unavailability or untrustworthiness of the security controller.

14. The method of claim 13, wherein, prior to the unavailability or untrustworthiness of the security controller, the premises controller securely transmits a list of premises node names and premises node passwords of the respective premises nodes to the back up security controller, and also transmits a node name of the back up security controller to the premises nodes.

15. The method of claim 12, wherein unavailability or untrustworthiness of the security controller is based on whether the security controller fails to re-authenticate a premises node by updating its NSC key within some time period.

16. A method for key management in a premises network, comprising:

establishing a plurality of node-to-security-controller (NSC) keys used for secure communication between a security controller and a plurality of premises nodes, respectively; wherein the security controller and premises nodes include respective hardware;

receiving an encrypted, co-creation key request at the security controller from a first of the plurality of premises nodes, wherein the co-creation key request includes a first modular exponentiation result that is based on a first secret random number selected by the first premises node;

at the security controller, decrypting the co-creation key request with a first NSC key associated with the first premises node;

encrypting the first modular exponentiation result with a second NSC key associated with a second of the plurality of premises nodes, and transmitting the encrypted first modular exponential result from the security controller to the second premises node;

receiving an encrypted reply message from the second premises node, wherein the encrypted reply message includes a second modular exponentiation result that is based on a second secret random number selected by the second premises node;

at the security controller, decrypting the encrypted reply message with a second NSC key associated with the second premises node; and encrypting the second modular exponentiation result with the first NSC key, and transmitting the encrypted second modular exponential result to the first premises node.

17. The method of claim 16, where the first and second premises nodes use the first and second secret random numbers, respectively, along with the second and first modular exponentiation results, respectively, to cooperatively determine a shared secret that is confidential from the security controller.

18. The method of claim 17, further comprising:

after the shared secret has been cooperatively determined, exchanging secure messages between the first and second premises nodes using a symmetric cipher, wherein a key for the symmetric cipher is based on the shared secret.

19. A method for key management in a private premises network, comprising:

at a premises node, obtaining a password (PW) which is known or to-be-known by a security controller having identifier SC, wherein the premises node and security controller include respective hardware and have identifiers A, SC, respectively;

at the premises node, selecting a random exponent $R_A$ and a prime number p, and sending an unencrypted authentication request from the premises node to the security controller, wherein the authentication request includes the quantity $$X = H_1(A|SC|PW) \cdot (g^{R_A} \bmod p);$$

at the premises node, receiving an authentication reply from the security controller, wherein the authentication reply includes the values S1 and Y, wherein $$S_1 = H_3\left(A|SC|PW \Big| \frac{X}{H_1(A|SC|PW)} \Big| g^{R_{SC}} \bmod p \Big| \left\{\left(\frac{X}{H_1(A|SC|PW)}\right)^{R_{SC}} \bmod p\right\}\right),$$

and wherein $Y = H_2(A|SC|PW) \cdot (g^{R_{sc}} \bmod p)$;

authenticating the security controller by comparing the value of S1 received in authentication reply to $S_1'$ as calculated by the premises node, wherein $$S_1' = H_3\left(A|SC|PW \Big| g^{R_A} \bmod p \Big| \frac{Y}{H_2(A|SC|PW)} \Big| \left\{\left(\frac{Y}{H_2(A|SC|PW)}\right)^{R_A} \bmod p\right\}\right) \text{ and}$$

comparing $S_1'$ to the value of S1 received in the authentication reply;

at the premises node, generating an initial node to security controller (NSC) key by calculating $$K_{A-SC} = H_3\left(A|SC|PW|g^{R_A} \bmod p \Big| \frac{Y}{H_2(A|SC|PW)} \Big| \left\{\left(\frac{Y}{H_2(A|SC|PW)}\right)^{R_A} \bmod p\right\}\right); \text{ and}$$

communicating a first secure message between the premises node and the security controller using the initial NCS key;

after the first secure message has been communicated, receiving a key update request at the premises node, the key update request originating from the security controller;

selectively co-generating an updated NCS key between the security controller and the premises node based on the key update request; and communicating a second secure message between the security controller and premises node using the updated NCS key.

* * * * *